(12) United States Patent
Bruenemann et al.

(10) Patent No.: US 6,711,894 B2
(45) Date of Patent: Mar. 30, 2004

(54) INTERNAL COMBUSTION ENGINE AND METHOD OF OPERATING SAME

(75) Inventors: Ralf Bruenemann, Stuttgart (DE); Eberhard Holder, Kusterdingen (DE); Roland Kemmler, Stuttgart (DE); Christoph Koehlen, Wernau (DE); Martin Matt, Bruchsal-Untergrombach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/136,432

(22) Filed: May 2, 2002

(65) Prior Publication Data
US 2002/0178713 A1 Dec. 5, 2002

(30) Foreign Application Priority Data
May 2, 2001 (DE) .......................... 101 21 388

(51) Int. Cl.$^7$ ................................. F01N 3/00
(52) U.S. Cl. ............... 60/289; 60/274; 60/283; 60/284; 60/285; 60/293; 123/516; 123/519; 123/520
(58) Field of Search ............. 60/274, 283, 284, 60/289, 290, 291, 293, 285; 123/516, 518, 519, 521, 520

(56) References Cited

U.S. PATENT DOCUMENTS

| | | | |
|---|---|---|---|
| 5,205,120 A | | 4/1993 | Oblaender et al. ............ 60/284 |
| 5,239,824 A | * | 8/1993 | Matsumoto ................... 60/283 |
| 5,273,020 A | * | 12/1993 | Hayami ....................... 123/520 |
| 5,544,483 A | * | 8/1996 | Heuer .......................... 60/283 |
| 5,806,304 A | * | 9/1998 | Price et al. ................... 60/274 |
| 5,950,419 A | * | 9/1999 | Nishimura et al. ........... 60/274 |
| 6,067,969 A | * | 5/2000 | Kemmler et al. ............ 123/548 |
| 6,122,908 A | * | 9/2000 | Wirmark ..................... 60/274 |

FOREIGN PATENT DOCUMENTS

| | | |
|---|---|---|
| DE | 40 41 628 | 7/1992 |
| DE | 42 15 949 | 4/1993 |

* cited by examiner

*Primary Examiner*—Binh Tran
(74) *Attorney, Agent, or Firm*—Crowell & Moring LLP

(57) ABSTRACT

An internal combustion engine has a preparation device for fuel, for the purpose of providing a starting fuel which comprises low-boiling fuel constituents. A catalytic converter is accommodated in an exhaust train of the internal combustion engine. After-treatment of the exhaust gases is carried out by a secondary air device, by means of the combustion being carried out with an excess of starting fuel for rich-burn operation during the cold start and the subsequent warm-up phase. The system is provided for spark-ignition mixture-compressing or spark-ignition direct injection internal combustion engines.

22 Claims, 1 Drawing Sheet

INTERNAL COMBUSTION ENGINE AND METHOD OF OPERATING SAME

BACKGROUND OF THE INVENTION

This application claims the priority of German Application No. 101 21 388.3 filed May 2, 2001, the disclosure of which is expressly incorporated by reference herein.

The invention relates to an internal combustion engine and to a method for operating an internal combustion engine having a preparation device for fuel which provides a starting fuel comprising low boiling temperature fuel constituents.

An internal combustion engine in which a distilled fuel which is produced on board is fed to the internal combustion engine in the starting phase and the subsequent warm-up phase is already known (German Patent Document DE 42 15 949 c1). This starting fuel/air mix, which comprises low-boiling constituents, referred to below as the starting fuel, is delivered via a metering valve to the induction pipe of the internal combustion engine downstream of a throttle valve. The use of starting fuel makes it possible for combustion which is as complete as possible to take place in the combustion chambers of the internal combustion engine. However, during the cold start of the internal combustion engine, the catalytic converter has not yet reached its operating temperature and is therefore substantially ineffective, so that, despite the use of starting fuel, in particular when power is demanded from the internal combustion engine during the warming up, uncleaned exhaust gases, such as hydrocarbons (HC) and in particular nitrogen oxides (NOx), can be discharged to the environment. It is therefore desirable for the catalytic converter to reach its operating temperature as quickly as possible.

Furthermore, German Patent Document DE 40 41 628 A1, corresponds to U.S. Pat. No. 5,205,120 has disclosed the blowing in of secondary air, the engine being operated with excess fuel during the time in which the secondary air is being blown in. The hydrocarbons (HC) which are formed in the exhaust gas as a result of the excess of fuel are then oxidized by means of secondary air, which is introduced into the exhaust train, in an afterburning step carried out in the catalytic converter, with heat being generated. During the cold-start phase of the internal combustion engine, this heat leads to the catalytic converter being heated as quickly as possible, in order, in this way, to obtain an accelerated response of the catalytic converter. However, despite this measure, it is impossible to avoid a considerable proportion of hydrocarbons (HC) and in particular of nitrogen oxides (NOx) being present in the exhaust gas.

ADVANTAGES OF THE INVENTION

The internal combustion engine according to the invention and the method according to the invention for operating the internal combustion engine utilize a secondary device provided for after-treatment of the exhaust gases in which air is blown into the exhaust train upstream of the catalytic converter, the combustion being carried out with an excess of starting fuel (rich-burn operation) during the cold start and the subsequent warm-up phase. The preferred embodiments of the invention have the advantage over prior systems in that the levels of emissions of harmful constituents in the exhaust gas from the internal combustion engine during the cold start and the subsequent warm-up phase of the internal combustion engine are lowered further, with the result that future stringent SULEV (super ultra low emission vehicles) exhaust limits can be complied with easily. It is particularly advantageous according to certain preferred embodiments of the invention that the catalytic converter is heated up particularly rapidly during the cold start. A further advantage of preferred embodiments is that predetermined exhaust limits for a prescribed test cycle, which requires power to be delivered from the internal combustion engine after a certain idling phase of the internal combustion engine in the warm-up phase, can be complied with.

The measures described herein and in the claims allow advantageous refinements and improvements to an internal combustion engine and the method for operating an internal combustion engine according to preferred embodiments of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
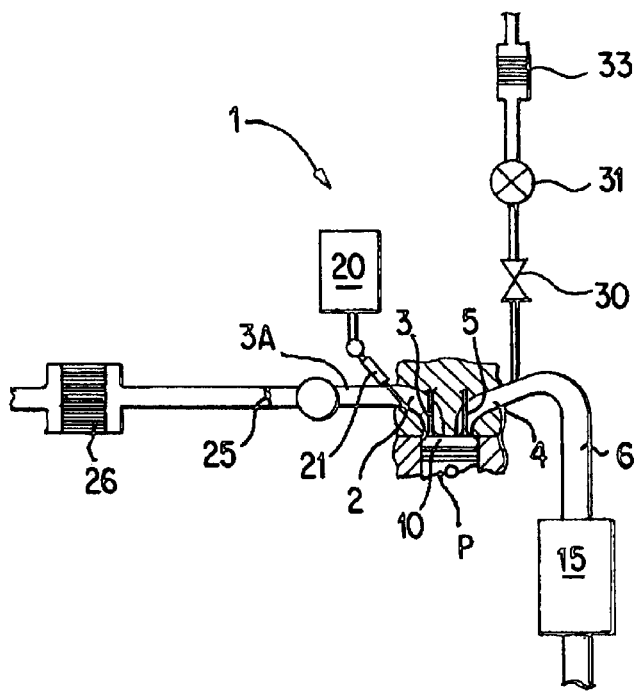
FIG. 1 is a schematic view which shows an internal combustion engine according to a preferred embodiment of the invention with a feature for blowing in secondary air and a means for introducing starting fuel.

FIG. 1 shows a diagrammatically simplified, partially sectional illustration of an internal combustion engine 1 which for each cylinder has at least one intake valve 3, which opens or closes an intake duct 2, and at least one exhaust valve 5, which opens or closes an exhaust duct 4. The exhaust valve 5 controls, in a known way, the discharge of the combustion gases from a combustion chamber 10 of the internal combustion engine 1, which is bounded by reciprocating piston P. These combustion gases escape into the exhaust duct 4 of the cylinder when the exhaust valve 5 is open. The exhaust duct 4 is adjoined, in a known way, by an exhaust train 6 with a catalytic converter 15.

The internal combustion engine 1 is a 4-stroke, spark-ignition design in which standard spark-ignition fuel, such as petrol or premium-grade petrol, is delivered into the induction pipe 3A (mixture-compressing) or directly into the combustion chamber 10 of the internal combustion engine 1 for subsequent combustion.

The introduction of the starting fuel/air mixture comprising low-boiling fuel constituents, referred to below as the starting fuel, is intended to take place during the cold-start phase and the subsequent warm-up phase of the internal combustion engine 1. The starting fuel can be produced on board by means of a known preparation device 20 or distillation device, for example by means of a reformer or evaporator. However, other ways of producing a fuel comprised of low-boiling fractions are also contemplated according to certain preferred embodiments of the invention. It is also contemplated to introduce a fuel-saturated fuel/air mix which originates from an adsorption filter (activated carbon filter) of a tank-venting installation for a fuel tank according to certain preferred embodiments of the invention. As illustrated in FIG. 1, the starting fuel can be delivered in metered fashion, via an injection valve 21, into the induction pipe 3A downstream of a throttle valve 25 of the internal combustion engine 1. However, direct injection into the combustion chamber 10 via a separate direct injection valve (not shown in more detail) or integrated in the direct injection valve for the direct injection of standard fuel for the combustion chamber 10 may also be provided. The air which is sucked in by the internal combustion engine 1 via an air filter 26 is, for example, mixed in by the throttle valve 25.

Controlled by a valve 30, secondary air which has been provided by a secondary air device 31 downstream of the exhaust valve 5 is released into the exhaust train 6 or in the immediate vicinity of the exhaust valve 5 or exhaust valves 5 into the exhaust duct 4 upstream of the catalytic converter 15. The secondary air device 31 may, for example, be a secondary air blower of known design which sucks the air out of the environment via an air filter 33. During this time when the secondary air is being blown in, the internal combustion engine 1 is operated with excess fuel, with increased emissions of carbon monoxide (CO) and hydrogen (H2). The air which is blown in causes thermal post-oxidation, which then, in the exhaust duct 4 or exhaust pipe 6 and, in particular, in the catalytic converter 15 results in afterburning (catalytic post-oxidation) of the hydrocarbons from the starting fuel, which then leads to rapid heating of the catalytic converter 15.

The use of starting fuel has the advantage that even during a cold start, this fuel is in almost completely evaporated form in the combustion chamber 10 by the time of ignition, leading to minimal HC emissions. Now, according to the invention, a combination of the introduction of starting fuel and the blowing in of secondary air is proposed, in which combination, during the cold start and the subsequent warm-up phase, the combustion in the combustion chamber 10 is carried out with an excess of starting fuel (rich-burn operation). In addition, the internal combustion engine 1 can also be operated with a late ignition angle, which further assists with avoiding HC emissions, On account of the exhaust gas composition, which is changed by the use of starting fuel compared to standard fuel, and the hydrocarbons which are present, the result, with the aid of the supply of secondary air, is highly exothermic afterburning or post-oxidation, so that the catalytic converter 15 is heated up very rapidly during the cold-start phase of the internal combustion engine 1. Moreover, the use of starting fuel has the effect that the exhaust gas has a relatively low level of raw emissions even without exhaust-gas treatment. Therefore, the result is that, even in the cold-start phase of the internal combustion engine 1, only very low levels of exhaust emissions, in particular of nitrogen oxides (NOx) and hydrocarbons (HC), occur.

Moreover, the low-boiling starting fuel offers the advantage of being in virtually completely evaporated form by the time of ignition, which represents an optimum condition for partial oxidation. Furthermore, the more favorable ratio of hydrogen to carbon results in a higher level of hydrogen in the exhaust gas when the internal combustion engine 1 is operated with excess fuel, with the result that the afterburning is likewise improved. In the same way, by better preparation of the mix, the ignition time can be shifted to a later time without drawbacks for the running of the internal combustion engine compared to normal fuel, which also improves the afterburning.

Figure 2:
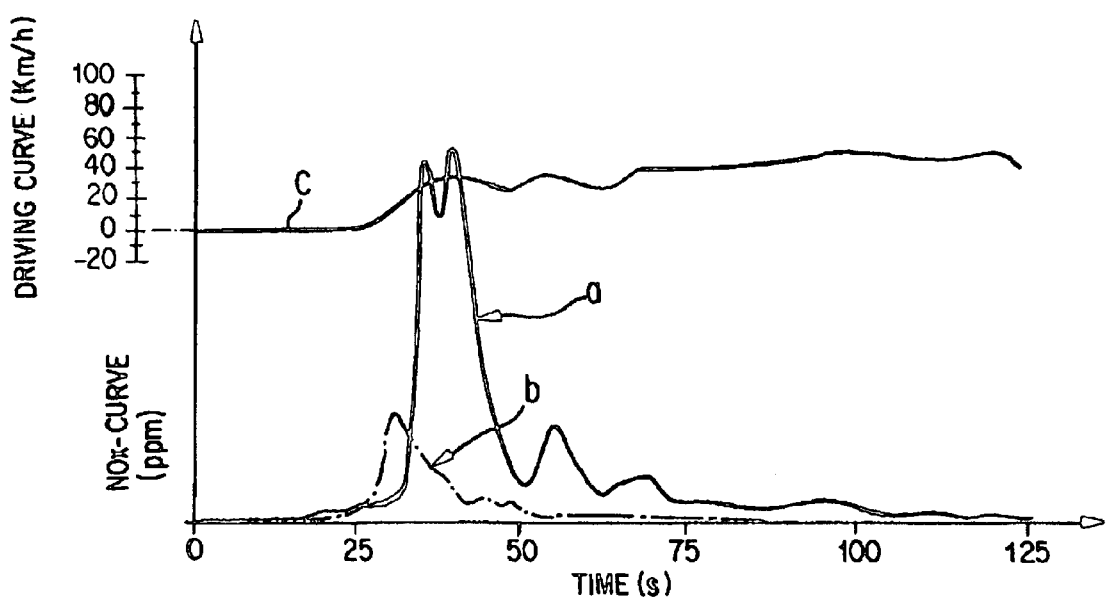
FIG. 2 shows a diagram illustrating the NOx curve over time and when travelling along a predetermined driving curve (c) using starting fuel (curve b) compared to standard fuel (curve a).

If, during the cold-start phase of the internal combustion engine, which lasts, for example, about 25 seconds after the start, power is then demanded from the internal combustion engine 1 (acceleration of the vehicle), as shown by the driving curve (c) illustrated in FIG. 2, the secondary air can be switched off and the internal combustion engine 1 can continue to be operated with starting fuel, the engine then shifting from rich-burn operation to stoichiometric combustion. The secondary air is switched off beyond a defined limit for the acceleration. The duration of further operation with starting fuel (total duration of operation with starting fuel in the exemplary embodiment being approximately 75 seconds) is dependent on various parameters, such as for example the oxygen loading of the catalytic converter 15 during the warm-up phase with secondary air being blown in, temperature of the catalytic converter 15, engine load and engine speed. Exemplary embodiments of the invention are contemplated with cold-start phase operation of the engine using starting fuel and secondary air supply lasting about 25 seconds and with further operation with starting fuel and secondary air switched off lasting between 25–65 seconds. This total duration of operating with exemplary embodiments in between 50 and 90 seconds.

The NOx curve which is formed during the combined operation with starting fuel and secondary air is indicated in FIG. 2 by a dot-dashed line b. For comparison purposes, FIG. 2 also shows a method of operating the internal combustion engine using exclusively standard fuel without the introduction of secondary air, as indicated by line a. This therefore demonstrates the considerable reduction in NOx with operating method b using starting fuel and secondary air.

The use of starting fuel beyond the actual cold-start phase offers the advantage of considerably lower NOx emissions. On account of the exhaust-gas composition, which is modified through the use of starting fuel, in combination with a supply of secondary air, this measure makes it possible to comply with exhaust limits and even for the emissions to be well below these limits which may occur in a driving cycle which is predetermined for an exhaust-gas test.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Internal combustion engine having any one of a distillation device, a reformer device and an evaporator configured to provide a starting fuel in a nonvaporous condition which comprises low-boiling fuel constituents, and having a catalytic converter in an exhaust train of the internal combustion engine, wherein a secondary air device is provided for after-treatment of the exhaust gases, wherein with the secondary air device secondary air is blown into the exhaust train upstream of the catalytic converter, wherein the combustion being carried out with the use of an excess of starting fuel (rich-burn operation) during the cold start and the subsequent warm-up phase, whereby a partial oxidation occurs with increased emissions of carbon monoxide (CO) and hydrogen ($H_2$) for improving the afterburning or post-oxidation.

2. Internal combustion engine according to claim 1, wherein an ignition angle in cold-start mode and during the subsequent warm-up phase of the internal combustion engine is shifted in a direction of late.

3. Internal combustion engine according to claim 1, wherein, while power is being demanded from the internal combustion engine (acceleration), the blowing of secondary air is switched off and operation of the internal combustion engine continues with starting fuel and under stoichiometric combustion.

4. Internal combustion engine according to claim 1, wherein after the internal combustion engine has been started, operation takes place by means of starting fuel for approximately 50 to 90 seconds, and then the internal combustion engine is operated by means of standard fuel.

5. Internal combustion engine according to claim 1, wherein after the internal combustion engine has been started, operation takes place by means of starting fuel for approximately 70 to 80 seconds, and then the internal combustion engine is operated by means of standard fuel.

6. Internal combustion engine according to claim 1, wherein after the internal combustion engine has been started, operation takes place by means of starting fuel for approximately about 75 seconds, and then the internal combustion engine is operated by means of standard fuel.

7. Method for operating an internal combustion engine having any one of a distillation device, a reformer device or an evaporator providing a starting fuel in nonvaporous condition, which comprises low-boiling fuel constituents, and having a catalytic converter in an exhaust train of the internal combustion engine, said method comprising operating a secondary air device for after-treatment of the exhaust gases, blowing secondary air with the secondary air device into the exhaust train upstream of the catalytic converter and carrying out the combustion with the use of an excess of starting fuel (rich-burn operation) during the cold start and the subsequent warm-up phase improving the afterburning or post-oxidation to perform a partial oxidation with increased emissions of carbon monoxide (CO) and hydrogen ($H_2$).

8. Method according to claim 7, wherein an ignition angle in cold-start mode and during the subsequent warm-up phase of the internal combustion engine is shifted in a direction of late.

9. Method according to claim 7, wherein when power is being demanded from the internal combustion engine (acceleration), the blowing of secondary air is switched off and operation of the internal combustion engine continues with starting fuel and under stoichiometric combustion.

10. Method according to claim 7, wherein after the internal combustion engine has been started, operation takes place by means of starting fuel for approximately 50 to 90 seconds, and then the internal combustion engine is operated by means of standard fuel.

11. Method according to claim 7, wherein after the internal combustion engine has been started, operation takes place by means of starting fuel for approximately 70 to 80 seconds, and then the internal combustion engine is operated by means of standard fuel.

12. Method according to claim 7, wherein after the internal combustion engine has been started, operation takes place by means of starting fuel for approximately about 75 seconds, and then the internal combustion engine is operated by means of standard fuel.

13. An internal combustion engine comprising:

means for supplying a starting fuel in nonvaporous condition on demand which comprises low-boiling constituents to an intake line leading to an engine combustion space, a catalytic converter disposed in an engine exhaust train downstream of the combustion space, a secondary air device operable to blow secondary air into the exhaust train upstream of the catalytic converter, and control means operable to operate the engine with combustion being carried out with the use of an excess of said starting fuel during a cold engine start and during a subsequent warm-up of phase of said engine and being carried out with a partial oxidation with increased emissions of carbon monoxide (CO) and hydrogen ($H_2$) for improving the afterburning or post-oxidation.

14. An internal combustion engine according to claim 13, wherein said control means is operable during engine power demands, immediately following a cold start to switch off blowing of secondary air in the exhaust train while maintaining engine operation with starting fuel and under stoichiometric combustion.

15. An internal combustion engine according to claim 13, wherein said control means is operable to supply starting fuel after a cold engine start for a period of 50–90 seconds, followed by operation with standard fuel.

16. An internal combustion engine according to claim 13, wherein said control means is operable to supply starting fuel after a cold engine start for a period of 70–80 seconds, followed by operation with standard fuel.

17. An internal combustion engine according to claim 13, wherein said control means is operable to supply starting fuel after a cold engine start for a period of 75 seconds, followed by operation with standard fuel.

18. A method for operating an internal combustion engine which includes:

means for supplying a starting fuel in nonvaporous condition on demand which comprises low-boiling constituents to an intake line leading to an engine combustion space, a catalytic converter disposed in an engine exhaust train downstream of the combustion space, a secondary air device operable to blow secondary air into the exhaust train upstream of the catalytic converter, and control means operable to operate the engine with combustion being carried out with the use of an excess of said starting fuel during a cold engine start and during a subsequent warm-up of phase of said engine, and said method comprising carrying out combustion with an excess of said starting fuel during a cold engine start and during a subsequent warm-up of phase of said engine, so that a partial oxidation with increased emissions of carbon monoxide (CO) and hydrogen ($H_2$) takes place for improving the afterburning or post-oxidation.

19. A method according to claim 18, comprising operating the engine during engine power demands immediately following a cold start by switching off blowing of secondary air in the exhaust train while maintaining engine operation with starting fuel and under stoichiometric combustion.

20. A method according to claim 18, comprising supplying starting fuel after a cold engine start for a period of 50–90 seconds, followed by operation with standard fuel.

21. A method according to claim 18, comprising supplying starting fuel after a cold engine start for a period of 70–80 seconds, followed by operation with standard fuel.

22. A method according to claim 18, comprising supplying starting fuel after a cold engine start for a period of about 75 seconds, followed by operation with standard fuel.

* * * * *